United States Patent [19]

König et al.

[11] Patent Number: 5,403,375
[45] Date of Patent: Apr. 4, 1995

[54] FINE-PARTICLE METAL POWDERS

[75] Inventors: Theo König, Laufenburg-Rotzel; Dietmar Fister, Murg-Niederhof, both of Germany

[73] Assignee: H.C. Starck GmbH & Co. KG, Goslar, Germany

[21] Appl. No.: 52,661

[22] Filed: Apr. 27, 1993

[30] Foreign Application Priority Data

May 4, 1992 [DE] Germany .................. 42 14 723.9

[51] Int. Cl.$^6$ .................. C22C 19/00; C22C 27/04
[52] U.S. Cl. .................. 75/255; 75/246; 75/248; 420/430; 420/441
[58] Field of Search ............ 75/254, 255, 245, 246, 75/248; 420/429, 430, 435, 441

[56] References Cited

U.S. PATENT DOCUMENTS

| | | | |
|---|---|---|---|
| 4,383,852 | 5/1983 | Yoshizawa | 75/0.5 B |
| 4,584,078 | 4/1986 | Nakanouchi et al. | 75/255 |
| 4,769,064 | 9/1988 | Buss et al. | 75/345 |

FOREIGN PATENT DOCUMENTS 0290177 11/1988 European Pat. Off. .
919954  2/1963 United Kingdom .
950148  2/1964 United Kingdom .

OTHER PUBLICATIONS

Patent Abstracts of Japan vol. 12, No. 219 (C-506) 22. Juni 1988 * JP-A-63 016 041 (Kawasaki Steel Corp) 23. Januar 1988 *Zusammenfassung*.
Journal of the Electrochemical Society Bd. 109, Nr. 8, Aug. 1962, Manchester, N.H. US, pp. 713-716, H. Lamprey et al "ultrafine tungsten and molybdenum powders".

Primary Examiner—George Wyszomierski
Attorney, Agent, or Firm—Connolly & Hutz

[57] ABSTRACT

This invention relates to fine-particle powders of the metals Fe, Co, Ni, W and/or Mo which have a defined particle size of 1.0 nm to less than 1 00 nm. Less than 1% of the individual particles of the powder deviate by more than 40% from the average particle size, and no individual particle of the powder deviates by more than 60% from the average particle size.

20 Claims, 1 Drawing Sheet

FINE-PARTICLE METAL POWDERS

This invention relates to fine-particle powders of the metals Fe, Co, Ni, W and/or Mo which have a defined particle size of 1.0 nm to less than 100 nm.

The mechanical properties of components produced by powder metallurgical techniques are critically determined by the properties of the starting powders. More particularly, a narrow particle size distribution, high powder purity and the absence of oversize particles or agglomerates have a positive effect on the properties of corresponding components.

There are many known processes for the industrial production of fine metal powders.

In addition to purely mechanical size-reducing and grading processes, which have the disadvantage that only powders up to a certain fineness and with a relatively broad particle size distribution can be produced, a large number of processes for deposition from the gas phase have also been proposed.

Due in part to very small energy sources, such as for example, thermal plasmas or laser beams, or where turbulent flames, such as for example a chlorine detonating gas burner, are used, the particle size distribution and particle size of the powders produced cannot be exactly controlled. The reaction conditions normally lead to a broad particle size distribution and to the occurrence of individual particles several times larger in diameter than the average particle size.

It is very difficult, if not impossible, to produce powders having average particle sizes of <0.5 μm, as measured by FSSS (and not individual particle sizes), by known industrial powder production processes. In the case of these conventionally produced fine powders, it is not possible in practice to prevent a certain percentage of oversize particles being present in the material to the detriment of the mechanical properties of components produced therefrom. Conventional grinding processes also give a very broad particle size distribution which in the case of these powders, cannot be significantly narrowed even by sizing steps.

Instead of a flow-optimized hot wall reactor, other gas-phase processes use a plasma flame or other energy sources, such as laser beams, for the reaction. Disadvantages of these processes are essentially the uncontrollable reaction conditions prevailing in various parts of the reaction zone with very steep temperature gradients and/or turbulent flow conditions. As a result, the powders formed have broad particle size distributions.

Numerous proposals for processes for the production of ultrafine metal powders have been put forward, but are all attended by disadvantages.

EP-A 0 290 177 describes the decomposition of transition metal carbonyls for the production of fine metallic powders. Powders having a particle fineness of up to 200 nm can be obtained by this process.

In the search for metals having improved mechanical, electrical and magnetic properties, there is a demand for increasingly freer metal powders.

Ultrafine metal powders ha the lower nanometer range can be produced by the noble gas condensation process. However, it is only possible by this process to produce quantities on the milligram scale. In addition, the powders obtained by this process do not have a narrow particle size distribution.

Accordingly, the problem addressed by the present invention was to provide fine-particle metal powders which would not have any of the described disadvantages of known powders.

Metal powders which satisfy these requirements have now been found. These powders are the subject of the present invention.

Accordingly, the present invention relates to fine-particle powders of the metals Fe, Co, Ni, Mo and/or W which have a defined particle size of 1.0 nm to less than 100 nm, less than 1% of the individual particles deviating by more than 40% from the average particle size and no individual particles deviating by more than 60% from the average particle size.

In a preferred embodiment, less than 1% of the individual particles deviate by more than 20% from the average particle size and no individual particles deviate by more than 50% from the average particle size. In a particularly preferred embodiment, less than 1% of the individual particles deviate by more than 10% from the average particle size and no particles deviate by more than 40% from the average particle size. The powders according to the invention preferably have particle sizes in the range from 1 to less than 50 nm, more preferably in the range from 1 to less than 10 nm and most preferably ha the range from 1 to less than 5 nm.

The metal powders according to the invention are highly pure. Thus, they preferably have an oxygen content of less than 5,000 ppm and, more preferably, less than 1,000 ppm.

Particularly pure metal powders according to the invention are characterized in that they have an oxygen content of less than 100 ppm and preferably less than 50 ppm.

The non-oxidic impurities are also minimal. In a preferred embodiment, the sum total of their impurities, except for the oxidic impurities, is less than 5,000 ppm and, more preferably, less than 1,000 ppm.

In a particularly preferred embodiment, the sum total of their impurities, except for the oxidic impurities, is less than 200 ppm.

The powders according to the invention can be obtained on an industrial scale and, accordingly, are preferably available in quantities of more than 1 kg. More preferably, the powders are produced in quantities of more than 1 kg per batch.

The powders according to the invention are obtainable by a process for the production of fine-particle metal powders by reaction of corresponding metal compounds and corresponding reactants in the gas phase —CVR—, the metal compound(s) and the other reactants being reacted in the gas phase in a reactor, homogeneously condensed directly from the gas phase in the absence of any wall reaction and subsequently removed from the reaction medium, characterized in that the metal compounds and the reactants are introduced separately from one another into the reactor at least the reaction temperature. In cases where several metal compounds and/or reactants are to be introduced, the particular gas mixtures should be selected so that no reaction leading to solid reaction products takes place during the heating phase. In a particularly advantageous embodiment, the process is carried out in a tube reactor. It is particularly favorable for the metal compounds, the reactants and the product particles to pass through the reactor under laminar flow conditions.

By separately preheating the process gases to at least the reaction temperature, the nucleation site can be confined. The laminar flow conditions prevailing in the reactor provide for a narrow residence tinge distribution of the nuclei or particles. A very narrow particle size distribution can be obtained in this way.

Accordingly, the metal compounds and the reactants should preferably be introduced into the reactor in the form of coaxial laminar streams.

However, to ensure that the two coaxial streams are intermixed, a Kárm,án vortex path of defined intensity and extent is produced by the incorporation of an obstacle in the otherwise strictly laminar flow.

In a preferred embodiment of this process, therefore, the coaxial laminar streams of the metal compound(s) and the reactants are mixed under conditions by means of a Kárm,án vortex path.

In order to prevent deposition of the reactants on the walls of the reactor, for which there is considerable preference in energy terms, the reaction medium is preferably screened off from the reactor wall by a layer of inert gas. This may be done, for example, by introducing an inert gas stream through specially shaped annular gaps in the reactor wall, this inert gas stream keeping to the reactor wall under the Coanda effect. The metal powder particles formed in the reactor by homogeneous deposition from the gas phase for typical residence times of 10 to 300 msec leave the reactor together with the gaseous reaction products (for example HCl), the unreacted reactants and the inert gases which are introduced as carrier gas, purging gas and for the purpose of reducing the adsorption of HCl. Yields of up to 100%, based on the metal component, can be obtained by the process according to the invention.

The metal powders are then preferably removed at temperatures above the boiling or sublimation temperatures of the metal compounds used, the reactants and/or any products inevitably formed during the reaction. The metal powders are advantageously removed in a blowback filter. If this filter is operated at high temperatures, for example 600° C., the adsorption of the gases, particularly the non-inert gases, such as HCl, to the very large surface of the ceramic powders can be minimized.

The remaining troublesome substances adsorbed onto the powder surfaces can be removed in a following vacuum vessel, again preferably at temperatures of the order of 600° C. The final powders should then be discharged from the plant in the absence of air.

According to the invention, preferred metal compounds are one or more metal compounds from the group consisting of metal halides, partly hydrogenated metal halides, metal hydrides, metal alcoholates, metal alkyls, metal amides, metal azides and metal carbonyls.

Hydrogen is used as another reactant. Further characteristics of the powders include their high purity, their high surface purity and their good reproducibility.

Depending on the particle size and the constituent material, the powders according to the invention can be highly sensitive to air or pyrophoric. To eliminate this property, the powders may be subjected to a defined surface modification by treatment with gas vapor mixtures.

DETAILED DESCRIPTION OF THE INVENTION

Figure 1:
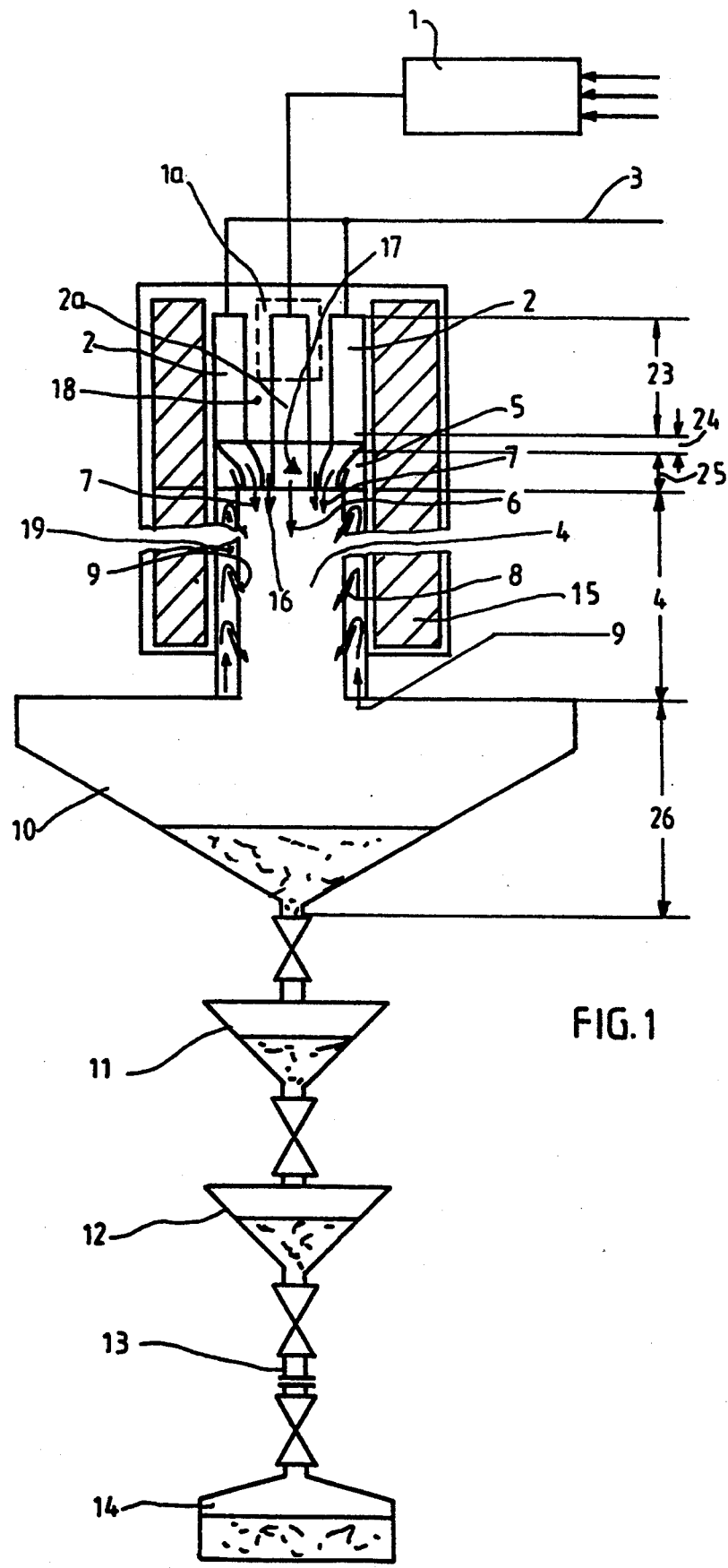
FIG. 1 diagrammatically illustrates an apparatus with which the powders according to the invention can be produced. The working of the process is described in the following with reference to FIG. 1. The process, material and/or apparatus parameters specifically mentioned are selected from many possibilities and, accordingly, do not limit the invention in may way.

The apparatus shown in FIG. 1 generally comprises a gas preheater (23), a gas-introduction part (24), a flow-shaping part (25), a reaction robe (4) and a product discharge device (26).

The solid, liquid or gaseous metal compounds are introduced into an externally arranged evaporator (1) or into an evaporator (1 a) arranged inside the high-temperature furnace, vaporized therein at temperatures of 200° to 2000° C. and transported into the gas preheater (2a) with an inert carrier gas ($N_2$, Ar or He). The other reactant (3) $H_2$ is also heated in at least one gas preheater (2). Before entering the robe reactor (4), the turbulent individual streams issuing from the gas preheaters (2) are combined in a nozzle (5) into two coaxial, laminar and rotationally symmetrical streams. The middle stream (6) containing the metal component and the surrounding stream (7) containing the hydrogen are mixed under defined conditions in the robe reactor (4). The reaction takes place at temperatures of 500° C. to 2000° C., for example in accordance with the following case examples:

$$WCl_6 + 3H_2 \rightarrow W + 6HCl \text{ or}$$

$$NiCl_2 + H_2 \rightarrow Ni + HCl$$

To ensure that the two coaxial streams are intermixed, a Kárm,án vortex path can be produced by incorporation of an obstacle (17) in the otherwise strictly laminar flow. In a preferred embodiment of the present invention, the obstacle (17) is disposed in the flow-shaping part (25), preferably along the longitudinal axis of the central coaxial nozzle (i.e., the nozzle which produces the middle stream (6)). The coaxial stream are separated at the nozzle outlet by a weak inert gas stream (16) to prevent growths around the nozzle (5).

It is particularly preferred to incorporate the evaporator within the high temperature furnace, for example, within the gas preheater (2a). This avoids the need for feed pipes outside the reactor, thus avoiding corrosion and the resulting impurities. By locating the evaporator within the preheater it is also possible to use non-metal materials for the construction of the evaporator, so that evaporation temperatures can be employed which are higher than the temperatures for which metal materials are designed.

In order to prevent the heterogeneous deposition of these substances on the hot walls of the reactor, for which there is a considerable preference in energy terms, the hot reactor wall is purged through annular gaps (8) with an inert gas stream (9) ($N_2$, Ar or He) which keeps to the reactor wall under the Coanda effect. The metal powder particles formed in the reactor by homogeneous deposition from the gas phase leave the reactor together with the gaseous reaction products (for example HCl), the inert gases and the unreacted reactants and pass directly into a blowback filter (10) in which they are deposited. The blowback filter (10) is operated at temperatures of 300° C. to 1000° C., so that adsorption of the gases, more particularly the non-inert gases, such as HCl, to the very large surface of these powders is kept at a low level. In a following vessel (11), residues of the adsorbed gases on the powders are further reduced by preferably alternate application of a vacuum and flooding with various gases at 300° C. to 1000° C. Good results are obtained when such gases as are used. It is particularly preferred to use SF$_6$.

Metastable systems and core/shell particles can also be produced by this process. Metastable systems are obtained by establishing very high cooling rates in the lower part of the reactor.

Core/shell particles are obtained by introducing additional reaction gases in the lower part of the reactor.

From the vacuum vessel (11), the powders enter the cooling vessel (12) before passing through the lock (13) into the collecting and transport vessel (14). In the cooling vessel (12), the particle surfaces can be subjected to defined surface modification by exposure to various gas/vapor mixtures.

Coated graphite, more particularly fine-particle graphite, is preferably used as the constituent material of those components which are exposed to temperatures of up to 2000° C. and higher, such as the heat exchangers (2) and (3), the nozzle (5), the reactor (4) and the robe (15) surrounding the reactor. Coating may be necessary, for example, if the necessary chemical stability of the graphite to the gases used, such as metal chlorides, HCl, H$_2$ and N$_2$, at the temperatures prevailing is inadequate or if erosion at relatively high flow rates (0.5 to 50 m/sec.) is very high or if the impermeability of graphite to gases can thus be increased or if the surface roughness of the reactor components can thus be reduced.

For example SiC, B$_4$C, TiN, TiC and Ni (only up to 1200° C.) may be used for the layers. Combinations of various layers, for example with a "characteristic" outer layer, are also possible. These layers may advantageously be applied by CVD, plasma spraying and electrolysis (Ni).

In cases where only low temperatures are required, metallic materials may also be used.

To adjust the particle sizes of the metal powders, three measures may simultaneously be applied:

establishing a certain ratio between the reaction gases and inert gases.

establishing a certain pressure.

establishing a certain temperature/residence time profile along the reactor axis.

The temperature/residence time profile is established as follows:

by two or more heating zones from the beginning of the gas preheater (2) to the end of the robe reactor (4).

by varying the cross-section of the reactor along its longitudinal axis.

by varying the gas throughputs and hence—for a predetermined reactor cross-section—the flow rates.

A significant advantage of the variability of the temperature/residence time profile is the possibility of separating the nucleation zone from the nucleus growth zone. Accordingly, it is possible—for the production of "relatively coarse" powders over short residence times at very low temperatures (i.e. small reactor cross-section for a certain length)—to allow the formation of only a few nuclei which can then grow into "coarse" particles over long residence times at high temperatures (large reactor cross-section). "Fine" powders can also be produced: numerous nuclei are formed in a zone of high temperature and relatively long residence time and, further along the reactor, grow only slightly over short residence times at low temperatures (small reactor cross-section). Any transitions between the extreme cases qualitatively illustrated here may also be adjusted.

The powders, of which some are highly sensitive to air or pyrophoric, can be desensitized in the cooling vessel (12) by injection of a suitable gas/vapor mixture. The particle surfaces of these metal powders may be coated both with an oxide layer of defined thickness and with suitable organic compounds, such as higher alcohols, amines or even sintering aids, such as paraffins, in an inert carder gas stream. The powders may also be coated to facilitate their further processing.

By virtue of their mechanical, electrical and magnetic properties, the nano-scale powders according to the invention are suitable for the production of new sensors, actors, cutting ceramics and cermets.

What is claimed is:

1. Fine-particle powders of at least one metal selected from the group consisting of Fe, Co, Ni, W and Mo which have an average particle size of from 1.0 nm to less than 100 nm, wherein less than 1% of the individual particles deviate by more than 40% from the average particle size of said powders and no individual particles deviate by more than 60% from the average particle size of said powders.

2. Metal powders as claimed in claim 1, wherein less than 1% of the individual particles deviate by more than 20% from the average particle size of said powders and no individual particles deviate by more than 50% from the average particle size of said powders.

3. Metal powders as claimed in claim 2, wherein less than 1% of the individual particles deviate by more than 10% from the average particle size of said powders and no individual particles deviate by more than 40% from the average particle size of said powders.

4. Metal powders as claimed in claim 2, wherein the average particle size is in the range from 1 to less than 50 nm.

5. Metal powders as claimed in claim 2, wherein the metal powders have an oxygen content of less than 5,000 ppm.

6. Metal powders as claimed in claim 1, wherein less than 1% of the individual particles deviate by more than 10% from the average particle size of said powders and no individual particles deviate by more than 40% from the average particle size of said powders.

7. Metal powders as claimed in claim 6, wherein the sum total of the impurities, except for the oxidic impurities, in the metal powders is less than 200 ppm.

8. Metal powders as claimed in claim 1, wherein the average particle size is in the range from 1 to less than 50 nm.

9. Metal powders as claimed in claim 8, wherein the sum total of the impurities, except for the oxidic impurities, in the metal powders is less than 5000 ppm.

10. Metal powders as claimed in claim 1, wherein the average particle size is in the range from 1 to less than 10 nm.

11. Metal powders as claimed in claim 10, wherein the sum total of the impurities, except for the oxidic impurities, in the metal powders is less than 200 ppm.

12. Metal powders as claimed in claim 1, wherein the metal powders have an oxygen content of less than 5,000 ppm.

13. Metal powders as claimed in claim 1, wherein the metal powders have an oxygen content of less than 1,000 ppm.

14. Metal powders as claimed in claim 1, wherein the metal powders have an oxygen content of less than 100 ppm.

15. Metal powders as claimed in claim 1, wherein the sum total of the impurities, except for the oxidic impurities, in the metal powders is less than 5000 ppm.

16. Metal powders as claimed in claim 1, wherein the sum total of the impurities, except for the oxidic impurities, in the metal powders is less than 1000 ppm.

17. Metal powders as claimed in claim 1, wherein the sum total of the impurities, except for the oxidic impurities, in the metal powders is less than 200 ppm.

18. Powders as claimed in claim 1, comprising a quantity of more than 1 kg.

19. Metal powders as claimed in claim 1, wherein the metal powders have an oxygen content of less than 50 ppm.

20. Fine-particle powders of at least one metal selected from the group consisting of Fe, Co, Ni, W and Mo which have an average particle size of from 1 to less than 5 nm, wherein less than 1% of the individual particles deviate by more than 40% from the average particle size of said powders and no individual particles deviate by more than 60% from the average particle size of said powders.

* * * * *